(12) United States Patent
Kim et al.

(10) Patent No.: US 12,015,143 B2
(45) Date of Patent: Jun. 18, 2024

(54) METHOD OF MANUFACTURING NEGATIVE ELECTRODE FOR SECONDARY BATTERY

(71) Applicant: LG ENERGY SOLUTION, LTD., Seoul (KR)

(72) Inventors: Ye Ri Kim, Daejeon (KR); Sang Wook Woo, Daejeon (KR); Oh Byong Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 447 days.

(21) Appl. No.: 17/292,544

(22) PCT Filed: Jan. 16, 2020

(86) PCT No.: PCT/KR2020/000836
§ 371 (c)(1),
(2) Date: May 10, 2021

(87) PCT Pub. No.: WO2020/149686
PCT Pub. Date: Jul. 23, 2020

(65) Prior Publication Data
US 2022/0006074 A1 Jan. 6, 2022

(30) Foreign Application Priority Data
Jan. 18, 2019 (KR) .................. 10-2019-0006526

(51) Int. Cl.
*H01M 4/04* (2006.01)
*H01M 4/02* (2006.01)
*H01M 4/1393* (2010.01)
*H01M 4/1395* (2010.01)
*H01M 4/36* (2006.01)
*H01M 4/48* (2010.01)
*H01M 4/587* (2010.01)

(52) U.S. Cl.
CPC ....... *H01M 4/1393* (2013.01); *H01M 4/0404* (2013.01); *H01M 4/0459* (2013.01); *H01M 4/1395* (2013.01); *H01M 4/366* (2013.01); *H01M 4/483* (2013.01); *H01M 4/587* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2005/0130043 A1* | 6/2005 | Gao | ....... | H01M 4/133 429/231.95 |
| 2010/0120179 A1 | 5/2010 | Zhamu et al. | | |
| 2017/0288211 A1 | 10/2017 | Zhamu et al. | | |
| 2017/0301910 A1 | 10/2017 | Wang et al. | | |
| 2017/0338480 A1 | 11/2017 | Kim et al. | | |
| 2018/0226641 A1 | 8/2018 | Yang et al. | | |
| 2018/0254480 A1 | 9/2018 | Kamo et al. | | |
| 2018/0268483 A1 | 9/2018 | Cho | | |
| 2019/0305298 A1 | 10/2019 | Chae et al. | | |
| 2020/0020975 A1* | 1/2020 | Pan | ....... | H01M 4/04 |
| 2020/0259164 A1 | 8/2020 | Wang et al. | | |
| 2020/0259180 A1* | 8/2020 | Shin | ....... | H01G 11/06 |

FOREIGN PATENT DOCUMENTS

| | | | | |
|---|---|---|---|---|
| CN | 106716682 A | 5/2017 | | |
| CN | 107004844 A | 8/2017 | | |
| CN | 107851777 A | 3/2018 | | |
| CN | 108028388 A | 5/2018 | | |
| CN | 108886143 A | 11/2018 | | |
| JP | 10-294104 A | 11/1998 | | |
| JP | WO2017/043039 A1 | 8/2018 | | |
| KR | 10-0291067 B1 | 6/2001 | | |
| KR | 10-0537366 B1 | 12/2005 | | |
| KR | 10-2015-0118304 A | 10/2015 | | |
| KR | 10-2016-0087121 A | 7/2016 | | |
| KR | 10-2016-0094652 A | 8/2016 | | |
| KR | 10-2017-0061677 A | 6/2017 | | |
| KR | 10-2017-0084894 A | 7/2017 | | |
| KR | 10-2017-0107213 A | 9/2017 | | |
| KR | 10-2017-0109293 A | 9/2017 | | |
| KR | 2017109293 A * | 9/2017 | ........ | H01M 10/0525 |
| KR | 10-2018-0051536 A | 5/2018 | | |
| KR | 10-2018-0127044 A | 11/2018 | | |
| WO | WO 2016/126046 A1 | 8/2016 | | |

OTHER PUBLICATIONS

International Search Report (PCT/ISA/210) issued in PCT/KR2020/000836 mailed on Apr. 29, 2020.
Extended European Search Report for European Application No. 20741147.1, dated Nov. 9, 2021.

* cited by examiner

*Primary Examiner* — Louis J Rufo
(74) *Attorney, Agent, or Firm* — Birch, Stewart, Kolasch & Birch, LLP

(57) ABSTRACT

A method of manufacturing a negative electrode for a secondary battery. The method includes forming a first negative electrode active material layer including a carbon-based active material on at least one surface of a negative electrode current collector; and forming a second negative electrode active material layer including a silicon-based active material on a surface of the first negative electrode active material opposite the negative electrode current collector, wherein the silicon-based material is intercalated with lithium by pre-lithiation on the first negative electrode active material layer.

11 Claims, No Drawings

METHOD OF MANUFACTURING NEGATIVE ELECTRODE FOR SECONDARY BATTERY

CROSS-REFERENCE TO RELATED APPLICATION

This application claims priority to and the benefit of Korean Patent Application No. 10-2019-0006526, filed Jan. 18, 2019, the disclosure of which is incorporated herein by reference in its entirety.

TECHNICAL FIELD

The present invention relates to a method of manufacturing a negative electrode for a secondary battery.

BACKGROUND ART

With the quick spread of electronic devices using batteries, such as cellular phones, laptop computers, electric vehicles, and the like, there has been a soaring demand for small and lightweight secondary batteries with relatively high capacity. In particular, lithium secondary batteries have come into the spotlight as driving power sources for portable devices because the lithium secondary batteries are lightweight and have a high energy density. Therefore, research and development efforts are actively under way to improve the performance of the lithium secondary batteries.

In general, the lithium secondary battery includes a positive electrode, a negative electrode, a separator interposed between the positive electrode and the negative electrode, an electrolyte, an organic solvent, and the like. The positive electrode and negative electrode may include an active material layer formed on a current collector, wherein the active material layer includes either a positive electrode active material or a negative electrode active material. In the positive electrode, a lithium-containing metal oxide such as $LiCoO_2$, $LiMn_2O_4$, or the like is generally used as the positive electrode active material. Therefore, a carbon-based material or a silicon-based material, which does not contain lithium, is used as the negative electrode active material in the negative electrode.

In the case of such a negative electrode, a passivation film such as a solid electrolyte interface layer (an SEI layer) is formed on a surface of the negative electrode during initial charging. In this case, because the passivation film prevents an organic solvent from being intercalated into the negative electrode and suppresses a decomposition reaction of the organic solvent, the passivation film serves to stabilize a structure of the negative electrode and improve reversibility of the negative electrode, and allows use as the negative electrode. However, because a formation reaction of the passivation film is irreversible, the lithium ions may be consumed, resulting in degraded battery capacity. As a charge/discharge cycle of a battery is repeated, the consumption of lithium ions may occur, resulting in degraded capacity and reduced cycle lifespan.

Accordingly, a method of forming a passivation film on a surface of a negative electrode in advance by pre-lithiating the negative electrode using a method of intercalating lithium into the negative electrode has been developed to prevent a loss in capacity and promote an improvement in cycle lifespan.

However, when the negative electrode is lithiated, excessive intercalation of lithium may result in damage to and structural collapse of the negative electrode active material, or may cause problems such as the volume expansion and structural deformation of the negative electrode, and the like, thereby reducing an adhesive force between the current collector and the negative electrode active material layer and resulting in degraded cycle characteristics. In this case, the negative electrode has a problem in that it is not possible to sufficiently achieve the purpose of pre-lithiation.

Therefore, there is a need for development of a negative electrode capable of promoting improvements in structural stability and cycle characteristics of the negative electrode while achieving the purpose of pre-lithiation.

Registered Korean Patent No. 10-0291067 discloses a method of pre-lithiating a carbon electrode and a method of manufacturing a lithium secondary battery using the same.

PRIOR-ART DOCUMENT

Patent Document

Registered Korean Patent No. 10-0291067

DISCLOSURE

Technical Problem

Therefore, it is an object of the present invention to provide a method of manufacturing a negative electrode for a secondary battery capable of stably forming a passivation film due to pre-lithiation, preventing a loss in capacity, promoting an improvement in reversibility of the negative electrode, and simultaneously improving an adhesive force between a current collector and a negative electrode active material layer, and structural stability and cycle characteristics of the negative electrode.

Technical Solution

To achieve the above object, according to one aspect of the present invention, there is provided a method of manufacturing a negative electrode for a secondary battery, which includes:

forming a first negative electrode active material layer including a carbon-based active material on a negative electrode current collector; and forming a second negative electrode active material layer including a silicon-based active material intercalated with lithium by pre-lithiation on the first negative electrode active material layer.

Advantageous Effects

According to a method of manufacturing a negative electrode for a secondary battery according to the present invention, a first negative electrode active material layer including a carbon-based active material is formed on at least one surface of a negative electrode current collector, and a second negative electrode active material layer including a silicon-based active material is formed on a surface of the first negative electrode active material layer opposite the negative electrode current collector. The silicon-based active material is intercalated with lithium by pre-lithiation. The second negative electrode active material layer does not come into direct contact with the negative electrode current collector due to the presence of the first negative electrode active material layer. As a result, the volume expansion of the second negative electrode active material layer caused by the pre-lithiation can have no direct effect on the current collector. Also, since the first negative electrode active material layer includes a carbon-based active material, and thus has a small change in volume according to charge/discharge, a decrease in an adhesive force between the negative electrode current collector and the first negative electrode active material layer can be prevented, thereby generally preventing problems such as structural deformation of the negative electrode and cell warping. Therefore, the method of manufacturing a negative electrode for a secondary battery according to the present invention can improve reversibility of the negative electrode through the pre-lithiation, improve an effect of preventing a loss in capacity. At the same time, the method of manufacturing a negative electrode for a secondary battery according to the present invention can prevent a decrease in adhesive force between the negative electrode current collector and the negative electrode active material layer and improve an effect of improving the lifespan characteristics.

BEST MODE

It should be understood that the terms or words used in this specification and the appended claims should not be construed as limited to general or dictionary meanings, but interpreted based on the meanings and concepts corresponding to technical aspects of the present invention on the basis of the principle that the inventors are allowed to define terms appropriately for the best explanation.

The terms used in this specification are merely used to explain exemplary embodiments, and are not intended to limit the present invention. The singular forms "a," "an" and "the" are intended to include the plural forms as well, unless the context clearly indicates otherwise.

It should be understood that the terms "comprising," "including" and/or "having," when used in this specification, specify the presence of stated features, integers, steps, components and/or groups thereof, but do not preclude the presence or addition of one or more other features, integers, steps, components and/or groups thereof.

In this specification, the term "average particle diameter $(D_{50})$" may be defined as a particle diameter corresponding to 50% of the cumulative volume in a particle size distribution curve. The average particle diameter $(D_{50})$ may, for example, be measured using a laser diffraction method. The laser diffraction method may generally measure a particle diameter ranging from a submicron region to approximately several millimeters and obtain the results of high reproducibility and high resolution.

Hereinafter, the present invention will be described in detail.

<Method of Manufacturing Negative Electrode for Secondary Battery>

The present invention relates to a method of manufacturing a negative electrode for a secondary battery, and more particularly, to a method of manufacturing a negative electrode for a lithium secondary battery.

The method of manufacturing a negative electrode for a secondary battery according to the present invention includes forming a first negative electrode active material layer including a carbon-based active material on a negative electrode current collector; and forming a second negative electrode active material layer including a silicon-based active material intercalated with lithium by pre-lithiation on the first negative electrode active material layer.

According to the method of manufacturing a negative electrode for a secondary battery according to the present invention, a first negative electrode active material layer including a carbon-based active material is formed on a negative electrode current collector, and a second negative electrode active material layer including a silicon-based active material is formed on the first negative electrode active material layer. The silicon-based active material contains lithium. Specifically, the silicon-based active material is in a form in which it is intercalated with lithium by pre-lithiation. The second negative electrode active material layer does not come into direct contact with the negative electrode current collector due to the presence of the first negative electrode active material layer. As a result, the volume expansion of the second negative electrode active material layer caused by the pre-lithiation may have no direct effect on the current collector. Also, because the first negative electrode active material layer includes a carbon-based active material, and thus has a small change in volume according to charge/discharge, a decrease in an adhesive force between the negative electrode current collector and the first negative electrode active material layer may be prevented, thereby generally preventing problems such as structural deformation of the negative electrode and cell warping. Therefore, the method of manufacturing a negative electrode for a secondary battery according to the present invention can improve reversibility of the negative electrode through the pre-lithiation, and improve an effect of preventing a loss in capacity. At the same time, the method of manufacturing a negative electrode for a secondary battery according to the present invention can prevent a decrease in adhesive force between the negative electrode current collector and the negative electrode active material layer and improve an effect of improving the lifespan characteristics.

The method of manufacturing a negative electrode for a secondary battery according to the present invention includes forming a first negative electrode active material layer including a carbon-based active material on a negative electrode current collector.

The negative electrode current collector is not particularly limited as long as it has high conductivity without causing any chemical change in a battery. Specifically, copper, stainless steel, aluminum, nickel, titanium, baked carbon, copper or stainless steel whose surface has been treated with carbon, nickel, titanium, silver, and the like, an aluminum-cadmium alloy, and the like may be used as the negative electrode current collector.

The negative electrode current collector may generally have a thickness of 3 to 500 μm.

The negative electrode current collector may enhance a bonding force of the negative electrode active material when fine irregularities are formed on a surface of the negative electrode current collector. For example, the negative electrode current collector may be used in various forms such as films, sheets, foil, nets, porous bodies, foams, non-woven fabrics, and the like.

The first negative electrode active material layer includes a carbon-based active material. Specifically, the first negative electrode active material layer may include a carbon-based active material which is not subjected to pre-lithiation. The carbon-based active material has a slight volume expansion and structural change even during an initial charge/discharge cycle or repeated charge/discharge cycles, compared to the silicon-based active material. Therefore, the adhesive force between the first negative electrode active material layer and the negative electrode current collector may be sufficiently maintained, and a degree of structural deformation of the first negative electrode active material layer may be small.

The carbon-based active material may include at least one selected from the group consisting of artificial graphite, natural graphite, hard carbon, soft carbon, carbon black, acetylene black, Ketjen black, graphene, and fibrous carbon, preferably at least one selected from the group consisting of artificial graphite and natural graphite in terms of the stable expression of capacity, and more preferably natural graphite.

The carbon-based active material may have an average particle diameter ($D_{50}$) of 5 μm to 35 μm, preferably 10 μm to 30 μm, and more preferably 15 μm to 25 μm. When the average particle diameter ($D_{50}$) of the carbon-based active material falls within this range, stable capacity expression is possible, which is desirable.

In the first negative electrode active material layer, the carbon-based active material may be included at a content of 50% by weight to 99% by weight, preferably 70% by weight to 97% by weight, and more preferably 80% by weight to 95% by weight, based on the total weight of the first negative electrode active material layer. When the content of the carbon-based active material falls within this range, an increase in capacity of the battery may be caused, and the capacity of the battery may be stably maintained, which are desirable.

The first negative electrode active material layer may further include a first binder along with the carbon-based active material.

The first binder is a material that contributes to the adhesive force between the negative electrode current collector and the carbon-based active material or between the carbon-based active materials. In this case, binder materials used in a conventional negative electrode for a secondary battery may be used without limitation.

Specifically, the first binder may include polytetrafluoroethylene (PTFE), polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), sulfonated EPDM, styrene butadiene rubber (SBR), fluorinated rubber, or various copolymers thereof, which may be used alone or in combination of two or more thereof.

The first binder may be included at a content of 1% by weight to 15% by weight, preferably 2% by weight to 8% by weight, based on the total weight of the first negative electrode active material layer. When the content of the first binder falls within this range, the first binder may preferably contribute to the improvement of the adhesive force between the negative electrode current collector and the carbon-based active material, and structural deformation of the negative electrode and cell warping may be prevented, which is desirable.

The first negative electrode active material layer may further include a first conductive material along with the carbon-based active material.

The conductive material is used to impart conductivity to the electrode. In the battery thus configured, the conductive material may be used without particular limitation as long as it has electronic conductivity without causing any chemical change. The first conductive material may specifically include graphite such as natural graphite, artificial graphite, or the like; porous carbon materials such as carbon black, acetylene black, Ketjen black, channel black, furnace black, lamp black, thermal black, carbon fibers, super P, and the like; metal powders or metal fibers such as copper, nickel, aluminum, silver, and the like; conductive whiskers such as zinc oxide, potassium titanate, and the like; conductive metal oxides such as titanium oxide, and the like; or conductive polymers such as polyphenylene derivatives, and the like, which may be used alone or in combination of two or more thereof. The first conductive material may be included at a content of 1% by weight to 30% by weight, based on the total weight of the first negative electrode active material layer.

The first negative electrode active material layer may have a thickness of 50 μm to 100 μm, preferably 58 μm to 82 μm, and more preferably 63 μm to 72 μm. Therefore, stable adhesion between the current collector and the first negative electrode active material layer is possible, which contributes to the overall stability of the negative electrode, which is desirable.

The method of manufacturing a negative electrode for a secondary battery according to the present invention includes forming a second negative electrode active material layer on the first negative electrode active material layer. The second negative electrode active material layer includes a silicon-based active material intercalated with lithium by pre-lithiation.

In general, the silicon-based active material has an advantage in that it generally has a very high capacity, compared to the carbon-based active material, and thus may accommodate more lithium. However, since such a silicon-based active material may accommodate more lithium, compared to the carbon-based active material, structural deformation of a cell due to volume expansion may be caused when the silicon-based active material comes into direct contact with a layer of the current collector. However, according to the manufacturing method of the present invention, because the second negative electrode active material layer including the silicon-based active material intercalated with lithium by the pre-lithiation does not come into direct contact with the negative electrode current collector and the first negative electrode active material layer may maintain the adhesive force between the negative electrode current collector and the second negative electrode active material layer, a decrease in the adhesive force between the negative electrode active material layer and the negative electrode current collector may be generally prevented, and structural deformation of the negative electrode and cell warping may be prevented. Therefore, the negative electrode manufactured by the method of manufacturing a negative electrode for a secondary battery according to the present invention may effectively exhibit pre-lithiation effects of improving reversibility, preventing a loss in capacity, and the like, and may also effectively prevent problems such as a loss in capacity caused by the structural deformation of the negative electrode, degradation in lifespan characteristics, and the like.

Specifically, the silicon-based active material may include a compound represented by the following Formula 1.

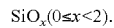

$SiO_x(0 \leq x < 2)$. [Formula 1]

Because $SiO_2$ may not react with lithium ions to store lithium, x preferably falls within this range. More preferably, the silicon-based active material may include SiO.

The silicon-based active material may have an average particle diameter ($D_{50}$) of 5 μm to 35 μm, preferably 10 μm to 20 μm, and more preferably 15 to 25 μm. When the average particle diameter ($D_{50}$) of the silicon-based active material falls within this range, pre-lithiation effects of improving reversibility, preventing a loss in capacity, and the like may be effectively exhibited, and structural deformation of the negative electrode caused by volume expansion may be minimized, thereby effectively preventing problems such as a loss in capacity caused by the structural deformation of the negative electrode, degradation in lifespan characteristics, and the like.

The silicon-based active material contains lithium, and is intercalated with lithium by the pre-lithiation.

The lithium may be intercalated into the inside and/or a surface of the silicon-based active material by the pre-lithiation. The lithium may be intercalated into the negative electrode active material in the form of lithium ions, a lithium compound and/or metal lithium, or may be intercalated into the negative electrode active material, followed by a reaction with the negative electrode active material to form an alloy.

Specifically, the pre-lithiation may be a method of intercalating lithium into the silicon-based active material using an electrochemical charging method, particularly a method including the following steps:

placing a first electrode and a second electrode into a pre-lithiation solution, wherein the pre-lithiation solution includes a lithium salt and an organic solvent;

adding a silicon-based active material to the pre-lithiation solution containing the first electrode and the second electrode; and intercalating lithium into the silicon-based active material by performing an oxidation/reduction reaction (a redox reaction) in the pre-lithiation solution.

Because the pre-lithiation method may adjust an intercalation rate of lithium to a proper level when compared to the conventional methods in which a lithium metal may be allowed to come into direct contact with the negative electrode so that lithium can be intercalated into the negative electrode, problems such as structural collapse of or damage to the active material, which may be caused by excessive intercalation of lithium, may be prevented.

Also, because a relatively inexpensive lithium salt is used as a lithium source used for intercalation into the silicon-based active material, the lithium salt is preferred in terms of cost saving, compared to the conventional method using the lithium metal as the lithium source.

The pre-lithiation method includes putting a first electrode and second electrode into a pre-lithiation solution including a lithium salt and an organic solvent.

The pre-lithiation solution includes a lithium salt and an organic solvent, and may be provided as a reaction site in which the silicon-based active material is pre-lithiated.

The organic solvent is not particularly limited as long as it can serve as a medium for performing an electrochemical reaction and a medium for the movement of ions. Specifically, ester-based solvents such as methyl acetate, ethyl acetate, γ-butyrolactone, ε-caprolactone, and the like; ether-based solvents such as dibutyl ether, tetrahydrofuran, or the like; ketone-based solvents such as cyclohexanone, and the like; aromatic hydrocarbon-based solvents such as benzene, fluorobenzene, and the like; carbonate-based solvents such as dimethyl carbonate (DMC), diethyl carbonate (DEC), ethyl methyl carbonate (EMC), ethylene carbonate (EC), propylene carbonate (PC), and the like; alcohol-based solvents such as ethyl alcohol, isopropyl alcohol, and the like; nitriles such as R-CN (wherein R is a linear, branched, or cyclic hydrocarbon group having 2 to 20 carbon atoms, which may include a double-bonded aromatic ring or an ether bond), and the like; amides such as dimethylformamide, and the like; dioxolanes such as 1,3-dioxolane, and the like; or sulfolane, and the like may be used. Among these, the ester-based solvents are preferred in terms of minimizing the loss of lithium ions due to their low dielectric constant. In particular, γ-butyrolactone is more preferred.

The lithium salt may include at least one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $Li_2CO_3$, $LiI$, and $LiB(C_2O_4)_2$, and may preferably include at least one selected from the group consisting of $LiCl$ and $Li_2CO_3$.

A concentration of the lithium salt may be in a range of 0.1 M to 5.0 M, and preferably 0.5 M to 2 M, based on the pre-lithiation solution. When the concentration of the lithium salt falls within this range, the lithium salt may be sufficiently dissolved in a solvent so that the pre-lithiation can be performed smoothly, which is desirable.

The first electrode and the second electrode are put into the solution for a redox reaction as will be described below. Specifically, the first electrode may be a nickel (Ni) or copper (Cu) electrode, particularly a nickel or copper electrode having a mesh structure. The second electrode may be a counter electrode of the first electrode, that is, a glassy carbon electrode.

The pre-lithiation method includes adding a silicon-based active material to the pre-lithiation solution.

The silicon-based active material may be the aforementioned silicon-based active material.

The pre-lithiation method includes intercalating lithium into the silicon-based active material by performing a redox reaction in the pre-lithiation solution.

The redox reaction may be performed by applying a current to the first electrode and the second electrode. In this case, a current condition may be in a range of 0.001 C to 5 C, preferably 0.05 C to 3 C, in consideration of the charge/discharge characteristics of the active material.

The pre-lithiation solution may be stirred during the redox reaction. The stirring may be performed at 100 to 700 rpm, preferably 300 to 500 rpm.

The redox reaction may be performed at 5 to 40° C., more preferably 10 to 30° C., in terms of improving a desired yield of the lithium-containing silicon-based active material.

The redox reaction may be performed for 3 hours to 12 hours, preferably 4 hours to 8 hours, in terms of sufficiently intercalating lithium into the silicon-based active material to smoothly perform the pre-lithiation.

In the second negative electrode active material layer, the silicon-based active material intercalated with lithium by the pre-lithiation may be included at a content of 50% by weight to 99% by weight, preferably 70% by weight to 97% by weight, and more preferably 80% by weight to 95% by weight, based on the total weight of the second negative electrode active material layer. When the content of the silicon-based active material falls within this weight range, pre-lithiation effects of improving reversibility, preventing a loss in capacity, and the like may be effectively exhibited, which is desirable.

The second negative electrode active material layer may further include a second binder along with the silicon-based active material.

Specifically, the second binder may include polytetrafluoroethylene (PTFE), polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), sulfonated EPDM, a styrene butadiene rubber (SBR), a fluorinated rubber, various copolymers thereof, or the like, which may be used alone or in combination of two or more thereof.

The second binder may be included at a content of 1% by weight to 25% by weight, preferably 2% by weight to 15% by weight, and more preferably 7 to 12% by weight, based on the total weight of the second negative electrode active material layer. When the content of the second binder falls within this range, the second binder may contribute to the improvement of the adhesive force between the silicon-based active materials intercalated with lithium by the pre-lithiation, and the prevention of the volume expansion, which is desirable.

The second negative electrode active material layer may further include a second conductive material along with the silicon-based active material.

The second conductive material is used to impart conductivity to the electrode. In the negative electrode thus configured, the second conductive material may be used without particular limitation as long as it has electronic conductivity without causing any chemical change. Specifically, the second conductive material may include graphite such as natural graphite, artificial graphite, or the like; porous carbon materials such as carbon black, acetylene black, Ketjen black, channel black, furnace black, lamp black, thermal black, carbon fibers, super P, and the like; metal powders or metal fibers such as copper, nickel, aluminum, silver, and the like; conductive whiskers such as zinc oxide, potassium titanate, and the like; conductive metal oxides such as titanium oxide, and the like; or conductive polymers such as polyphenylene derivatives, and the like, which may be used alone or in combination of two or more thereof. The second conductive material may be included at a content of 1% by weight to 30% by weight, based on the total weight of the second negative electrode active material layer.

The second negative electrode active material layer may have a thickness of 20 μm to 100 μm, preferably 40 μm to 70 μm, and more preferably 50 μm to 60 μm. When the thickness of the second negative electrode active material layer falls within this range, an adhesive force to the first negative electrode active material layer may be stably maintained, which is desirable.

A weight ratio of the carbon-based active material included in the first negative electrode active material layer and the silicon-based active material included in the second negative electrode active material layer may be in a range of 45:65 to 95:5, preferably 56:44 to 84:16, and more preferably 66:34 to 74:26. When the weight ratio fall within this range, effects of improving the initial efficiency by the pre-lithiation and improving reversibility of the negative electrode may be improved, and an effect of improving the adhesive force of the first negative electrode active material layer to the negative electrode current collector and the second negative electrode active material layer may also be maximized.

When the first negative electrode active material layer and the second negative electrode active material layer respectively include the first binder and the second binder, a weight ratio of the first binder included in the first negative electrode active material layer and the second binder included in the second negative electrode active material layer may be in a range of 30:70 to 85:15, preferably 38.5:61.5 to 73:27, and more preferably 47:53 to 58:42. When the weight ratio fall within this range, effects of improving the initial efficiency by the pre-lithiation and improving reversibility of the negative electrode may be improved, and an effect of improving the adhesive force of the first negative electrode active material layer to the negative electrode current collector and the second negative electrode active material layer may also be maximized.

A ratio of the thickness of the second negative electrode active material layer to the thickness of the first negative electrode active material layer may be in a range of 0.15 to 1.10, preferably 0.45 to 1.02, and more preferably 0.70 to 0.92. When the ratio of the thickness falls within this range, effects of improving the initial efficiency by the pre-lithiation and improving reversibility of the negative electrode may be improved, and an effect of improving the adhesive force of the first negative electrode active material layer to the negative electrode current collector and the second negative electrode active material layer may also be maximized.

The negative electrode manufactured by the aforementioned manufacturing method has improved reversibility and initial efficiency, and exhibits slight structural deformation due to the improved adhesive force between the negative electrode current collector and the negative electrode active material layer. Therefore, the negative electrode manufactured by the manufacturing method of the present invention may be applied to secondary batteries. In particular, the negative electrode may be preferably applied to lithium secondary batteries.

The secondary battery may include the negative electrode for a secondary battery manufactured by the aforementioned manufacturing method; a positive electrode facing the negative electrode for a secondary battery; a separator interposed between the negative electrode for a secondary battery and the positive electrode; and an electrolyte. The negative electrode for a secondary battery is as described above, and the positive electrode, the separator, and the electrolyte may be used without limitation as long as they are used in conventional lithium secondary batteries.

The secondary battery is useful in the fields of portable devices such as cellular phones, laptop computers, digital cameras, and the like, and electric vehicles such as hybrid electric vehicle (HEV), and the like.

Also, the secondary battery may be applied to battery modules including the secondary battery as a unit cell, or battery packs including the same.

The battery modules or the battery packs may be used as a power sources for any one or more medium and large devices among a power tool; an electric car including an electric vehicle (EV), a hybrid electric vehicle, and a plug-in hybrid electric vehicle (PHEV); or a power storage system.

Hereinafter, exemplary embodiments of the present invention will be described in detail so that a person having ordinary skill in the art to which the present invention belongs can easily put the invention into practice. However, it should be understood that the present invention may be embodied in various forms and is not intended to limit the exemplary embodiments described herein.

EXAMPLES

Example 1

Manufacture of Negative Electrode for Secondary Battery

1. Preparation of Silicon-Based Active Material Intercalated with Lithium by Pre-Lithiation LiCl as a lithium salt was added to γ-butyrolactone as an organic solvent so that a concentration of LiCl was 1 M, and then mixed to prepare a pre-lithiation solution.

A mesh-type copper electrode and a glassy carbon electrode serving as the first and second electrodes, respectively, were put into the pre-lithiation solution.

As the silicon-based active material, SiO (having an average particle diameter ($D_{50}$) of 20 μm) was added to the pre-lithiation solution.

An external current was applied to the first and second electrode at a current rate of 0.1 C to perform a redox reaction. The redox reaction was performed at 25° C. for 6 hours while stirring at a rate of 400 rpm.

The silicon-based active material intercalated with lithium by the pre-lithiation was prepared using the pre-lithiation method.

2. Manufacture of Negative Electrode

Copper foil having a thickness of 20 μm was prepared as the negative electrode current collector.

Natural graphite (having an average particle diameter ($D_{50}$) of 20 μm), PVdF, and Super P as a carbon-based active material, a first binder, and a first conductive material, respectively, were mixed at a weight ratio of 90:5:5 to prepare a first negative electrode slurry. Thereafter, the negative electrode current collector was coated with the first negative electrode slurry, rolled, and then dried to form a first negative electrode active material layer (thickness: 66 μm).

The silicon-based active material thus prepared, which had been intercalated with lithium by the pre-lithiation, PVdF as a second binder, and Super P as a second conductive material were mixed at a weight ratio of 85:10:5 to prepare a second negative electrode slurry. Thereafter, the first negative electrode active material layer was coated with the second negative electrode slurry, rolled, and then dried to form a second negative electrode active material layer (thickness: 56 μm). As a result, the negative electrode for a secondary battery of Example 1 was manufactured.

In this case, a weight ratio of the carbon-based active material included in the first negative electrode active material layer and the silicon-based active material included in the second negative electrode active material layer was 70:30.

Also, a weight ratio of the first binder included in the first negative electrode active material layer and the second binder included in the second negative electrode active material layer was approximately 52.4:47.6.

Further, a ratio of the thickness of the second negative electrode active material layer to the thickness of the first negative electrode active material layer was approximately 0.85 (=56 μm/66 μm).

Example 2

Manufacture of Negative Electrode for Secondary Battery

A negative electrode for a secondary battery of Example 2 was manufactured in the same manner as in Example 1, except that a thickness of the first negative electrode active material layer was 79 μm, a thickness of the second negative electrode active material layer was 44 μm, a ratio of the thickness of the second negative electrode active material layer to the thickness of the first negative electrode active material layer was approximately 0.56 (=44 μm/79 μm), a weight ratio of the carbon-based active material included in the first negative electrode active material layer and the silicon-based active material included in the second negative electrode active material layer was 80:20, and a weight ratio of the first binder included in the first negative electrode active material layer and the second binder included in the second negative electrode active material layer was approximately 65.4:34.6.

Example 3

Manufacture of Negative Electrode for Secondary Battery

A negative electrode for a secondary battery of Example 3 was manufactured in the same manner as in Example 1, except that a thickness of the first negative electrode active material layer was 61 μm, a thickness of the second negative electrode active material layer was 62 μm, a ratio of the thickness of the second negative electrode active material layer to the thickness of the first negative electrode active material layer was 1.01 (=62 μm/61 μm), a weight ratio of the carbon-based active material included in the first negative electrode active material layer and the silicon-based active material included in the second negative electrode active material layer was 60:40, and a weight ratio of the first binder included in the first negative electrode active material layer and the second binder included in the second negative electrode active material layer was approximately 41.5:58.5.

Comparative Example 1

Manufacture of Negative Electrode for Secondary Battery

A negative electrode for a secondary battery of Comparative Example 1 was manufactured in the same manner as in Example 1, except that, as the active material included in the second negative electrode slurry, SiO (having an average particle diameter ($D_{50}$) of 20 μm), which was not intercalated with lithium because it was not subjected to pre-lithiation, was used instead of the silicon-based active material prepared in Example 1, which had been intercalated with lithium by the pre-lithiation.

Comparative Example 2

Manufacture of Negative Electrode for Secondary Battery

A negative electrode for a secondary battery of Comparative Example 2 was manufactured by coating a copper foil-type negative electrode current collector (thickness: 20 μm) with a negative electrode slurry of Comparative Example 2 including a mixture (as the active material) obtained by mixing natural graphite used in Example 1 and the silicon-based active material intercalated with lithium by the pre-lithiation at a weight ratio of 70:30; PVdF (as the binder); and Super P (as the conductive material) at a weight ratio of 88.5:6.5:5, and drying the negative electrode current collector to form a single-layered negative electrode active material layer (thickness 122 μm).

Comparative Example 3

Manufacture of Negative Electrode for Secondary Battery

1. Preparation of Carbon-Based Active Material Intercalated with Lithium by Pre-Lithiation LiCl as the lithium salt was added to γ-butyrolactone as the organic solvent so that a concentration of LiCl was 1 M, and then mixed to prepare a pre-lithiation solution.

A mesh-type copper electrode and a glassy carbon electrode serving as the first and second electrodes, respectively, were put into the pre-lithiation solution.

Natural graphite (having an average particle diameter ($D_{50}$) of 20 μm) was added to the pre-lithiation solution.

An external current was applied to the first and second electrode at a current rate of 0.1 C to perform a redox reaction. The redox reaction was performed at 25° C. for 6 hours while stirring at a rate of 400 rpm.

The natural graphite (a second carbon-based active material) intercalated with lithium was prepared using the pre-lithiation method.

2. Manufacture of Negative Electrode

Copper foil having a thickness of 20 μm was prepared as the negative electrode current collector.

Natural graphite (having an average particle diameter ($D_{50}$) of 20 μm), PVdF, and Super P were mixed as the first carbon-based active material, the first binder, and the first conductive material, respectively, at a weight ratio of 90:5:5 to prepare a first negative electrode slurry. Thereafter, the negative electrode current collector was coated with the first negative electrode slurry, rolled, and then dried to form a first negative electrode active material layer (thickness: 66 μm).

The second carbon-based active material thus prepared, which had been intercalated with lithium by the pre-lithiation, PVdF as the second binder, and Super P as the second conductive material were mixed at a weight ratio of 85:10:5 to prepare a second negative electrode slurry. Thereafter, the first negative electrode active material layer was coated with the second negative electrode slurry, rolled, and then dried to form a second negative electrode active material layer (thickness: 56 μm). As a result, the negative electrode for a secondary battery of Example 1 was manufactured.

In this case, a weight ratio of the first carbon-based active material included in the first negative electrode active material layer and the second carbon-based active material included in the second negative electrode active material layer was 70:30.

Also, a weight ratio of the first binder included in the first negative electrode active material layer and the second binder included in the second negative electrode active material layer was approximately 52.4:47.6.

Further, a ratio of the thickness of the second negative electrode active material layer to the thickness of the first negative electrode active material layer was approximately 0.85 (=56 μm/66 μm).

Experimental Example 1

Evaluation of Initial Efficiency

<Manufacture of Lithium Secondary Battery>

Each of the negative electrodes for a secondary battery manufactured above in Examples 1 to 3 and Comparative Examples 1 to 3 was punched into a size of a coin cell. Thereafter, a polyolefin separator was interposed between the negative electrode and lithium metal foil as a counter electrode, and an electrolyte solution, in which 1 M $LiPF_6$ was dissolved in a solvent obtained by mixing ethylene carbonate (EC) and ethyl methyl carbonate (DEC) at a volume ratio of 50:50, was injected to manufacture a coin-type half cell.

<Evaluation of Initial Efficiency>

Charge/discharge reversibility tests were conducted on the lithium secondary batteries manufactured in Examples and Comparative Examples using an electrochemical charger/discharger. The lithium secondary batteries were charged by applying a current at a current density of 0.1 C rate to a voltage of 0.005 V (vs. Li/Li$^+$) during charging and discharged at the same current density to a voltage of 1.5 V during discharging.

Initial reversibility tests were conducted by measuring the initial efficiency according to the following Equation 1. The results are listed in the following Table 1.

Initial Efficiency (%)=(Discharge Capacity for First Cycle)/(Charge Capacity for First Cycle)×100

TABLE 1

|  | Initial Efficiency (%) |
| --- | --- |
| Example 1 | 101.3 |
| Example 2 | 109.2 |
| Example 3 | 94.3 |
| Comparative Example 1 | 78.4 |
| Comparative Example 2 | 79.9 |
| Comparative Example 3 | 104.6 |

Referring to Table 1, it can be seen that the negative electrodes for a secondary battery manufactured in Examples 1 to 3, in which the first negative electrode active material layer including the carbon-based active material and the second negative electrode active material layer including the silicon-based active material intercalated with lithium by the pre-lithiation were formed, exhibited superior initial efficiency, compared to those of Comparative Examples 1 and 2. As a result, it can be seen that an excellent effect of improving initial efficiency by the pre-lithiation was realized.

The negative electrode for a secondary battery manufactured in Comparative Example 3 exhibited a level of initial efficiency similar to those of Examples, but was evaluated to have poor performance in the sections "Evaluation of Discharge Capacity" and "Evaluation of Adhesive Force" as described below. Therefore, the negative electrode for a secondary battery of Comparative Example 3 generally exhibited poor performance, compared to these of Examples.

Experimental Example 2

Evaluation of Discharge Capacity

Discharge capacities and capacity retention rates of the lithium secondary batteries manufactured in Examples and Comparative Examples were evaluated using an electrochemical charger/discharger. The lithium secondary batteries were charged by applying a current at a current density of 0.1 C rate to a voltage of 0.005 V (vs. Li/Li$^+$) during charging and discharged at the same current density to a voltage of 1.5 V during discharging. Specifically, the evaluation of the discharge capacity was performed by measuring discharge capacities of the lithium secondary batteries of Examples and Comparative Examples for the third cycle. In this case, when it was assumed that the discharge capacity of the lithium secondary battery of Example 1 for the third cycle was 100%, the discharge capacities of the lithium secondary batteries of the other Examples and Comparative Examples were measured as relative values (%).

TABLE 2

| | Evaluation of Discharge Capacity (%) |
|---|---|
| Example 1 | 100 |
| Example 2 | 83.4 |
| Example 3 | 116.0 |
| Comparative Example 1 | 101.4 |
| Comparative Example 2 | 100 |
| Comparative Example 3 | 45.3 |

Referring to Table 2, it can be seen that the negative electrodes for a secondary battery manufactured in Examples 1 to 3, in which the first negative electrode active material layer including the carbon-based active material and the second negative electrode active material layer including the silicon-based active material intercalated with lithium by the pre-lithiation were formed, exhibited remarkably excellent discharge capacity, compared to that of Comparative Example 3.

The negative electrodes for a secondary battery manufactured in Comparative Examples 1 and 2 had a level of discharge capacity similar to that of Example 1, but exhibited poor performance in the initial efficiency, and had a very poor adhesive force between the current collector and the negative electrode active material layer as described below. Therefore, the negative electrodes for a secondary battery of Comparative Examples 1 and 2 were generally evaluated to exhibit poor performance.

Experimental Example 3

Evaluation of Adhesive Force

Each of the negative electrodes for a secondary battery manufactured in Examples 1 to 3 and Comparative Examples 1 to 3 was cut into pieces with a size of 1 cm×10 cm. A double-sided tape (Brand Name: 3M 9070 commercially available from 3M) having a slide glass with a size of 2.6 cm×7.6 cm (commercially available from Marienfeld Superior) attached to one surface thereof was attached to one surface of a negative electrode active material layer of each of the cut negative electrodes for a secondary battery. Samples were prepared by pressing the slide glass-attached negative electrodes for a secondary battery back and forth five times with a 2 kg roller.

Each of the samples was coupled to an adhesive force-measuring apparatus (Brand Name: LLOYD Instrument LF Plus commercially available from AMETEK) so that a surface of the sample to which the slide glass was attached was positioned at the bottom. Thereafter, peel strength between the negative electrode current collector and the negative electrode active material layer was measured by pulling a portion of a current collector at an angle of 180° and a rate of 300 mm/min to peel off the current collector.

When it was assumed that the adhesive force measured for the negative electrode for a secondary battery of Example 1 was 100%, the adhesive forces measured for negative electrodes for a secondary battery of Example 2-3, and Comparative Example 1-3 were measured as relative values (%). The results are listed in the following Table 3.

TABLE 3

| | Evaluation of Adhesive Force (%) |
|---|---|
| Example 1 | 100 |
| Example 2 | 92.4 |
| Example 3 | 83.7 |
| Comparative Example 1 | 54.4 |
| Comparative Example 2 | 49.7 |
| Comparative Example 3 | 82.3 |

Referring to Table 3, it was evaluated that the negative electrodes for a secondary battery manufactured in Examples 1 to 3, in which the first negative electrode active material layer including the carbon-based active material and the second negative electrode active material layer including the silicon-based active material intercalated with lithium by the pre-lithiation were formed, generally had a superior adhesive force, compared to those of Comparative Examples, because the second negative electrode active material layer including the pre-lithiated silicon-based active material did not come into direct contact with the negative electrode current collector and the first negative electrode active material layer maintained the adhesive force between the negative electrode current collector and the second negative electrode active material layer.

The invention claimed is:

1. A method of manufacturing a negative electrode for a secondary battery, comprising:
   pre-lithiating a silicon-based active material to obtain a pre-lithiated silicon-based active material having lithium intercalated into the silicon-based active material, wherein the pre-lithiating is performed by placing a mesh-type copper electrode and a glassy carbon electrode into a pre-lithiation solution, wherein the pre-lithiation solution comprises a lithium salt and an organic solvent;
   adding the silicon-based active material to the pre-lithiation solution containing the mesh-type copper electrode and the glassy carbon electrode; and
   intercalating lithium into the silicon-based active material by performing an oxidation/reduction reaction in the pre-lithiation solution;
   forming a first negative electrode active material layer comprising a carbon-based active material on at least one surface of a negative electrode current collector; and
   forming a second negative electrode active material layer comprising the pre-lithiated silicon-based active material on a surface of the first negative electrode active material layer opposite the negative electrode current collector.

2. The method of claim 1, wherein the oxidation/reduction reaction is performed by applying a current to the mesh-type copper electrode and the glassy carbon electrode at a rate of 0.001 C to 5 C.

3. The method of claim 1, wherein the oxidation/reduction reaction is performed at 5° C. to 40° C.

4. The method of claim 1, wherein the carbon-based active material comprises at least one selected from the group consisting of artificial graphite, natural graphite, hard carbon, soft carbon, carbon black, acetylene black, Ketjen black, graphene, and fibrous carbon.

5. The method of claim 1, wherein the carbon-based active material has an average particle diameter ($D_{50}$) of 5 μm to 35 μm.

6. The method of claim 1, wherein the silicon-based active material comprises a compound represented by the following Formula 1:

$$SiO_x (0 \leq x < 2) \qquad \text{[Formula 1]}.$$

7. The method of claim 1, wherein the silicon-based active material has an average particle diameter ($D_{50}$) of 5 μm to 35 μm.

8. The method of claim 1, wherein a weight ratio of the carbon-based active material present in the first negative electrode active material layer to the silicon-based active material present in the second negative electrode active material layer is in a range of 45:65 to 95:5.

9. The method of claim 1, wherein a ratio of a thickness of the second negative electrode active material layer to a thickness of the first negative electrode active material layer is in a range of 0.15 to 1.10.

10. The method of claim 1, wherein the first negative electrode active material layer further comprises a first binder, and the second negative electrode active material layer further comprises a second binder.

11. The method of claim 10, wherein a weight ratio of the first binder present in the first negative electrode active material layer to the second binder present in the second negative electrode active material layer is in a range of 30:70 to 85:15.

\* \* \* \* \*